Sept. 1, 1936.    L. R. BIGGS    2,053,127
METHOD OF MANUFACTURING A HEATING ELEMENT
Filed Aug. 30, 1934
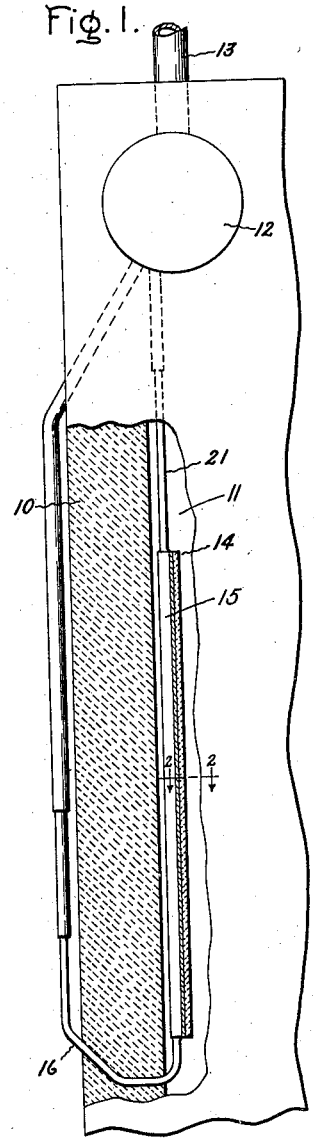
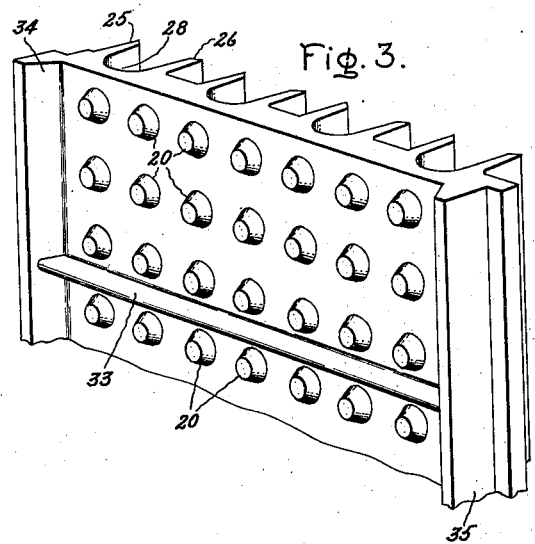
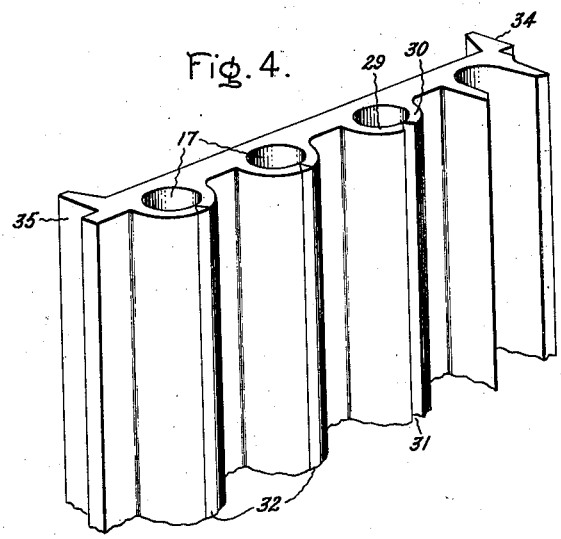
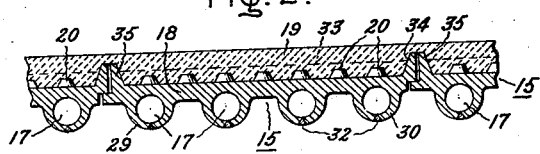
Inventor:
Leonard R. Biggs,
by Harry E. Dunham
His Attorney.

Patented Sept. 1, 1936

2,053,127

UNITED STATES PATENT OFFICE 2,053,127

METHOD OF MANUFACTURING A HEATING ELEMENT

Leonard R. Biggs, Schenectady, N. Y., assignor to General Electric Company, a corporation of New York Application August 30, 1934, Serial No. 742,138

4 Claims. (Cl. 29—157.4)

The present invention relates to mercury boilers comprising containers and heating elements for heating and evaporating mercury liquid or like fluid, more specifically to the kind of boilers in which such heating elements form wall screens lining the walls of a furnace and protecting such walls against excessive heat in the combustion space.

One object of my invention is to provide an improved construction and arrangement of wall screen heating elements, and the principal object of my invention is to provide an improved method of manufacturing wall screen heating elements.

For a consideration of what I believe to be novel and my invention, attention is directed to the following description and the claims appended thereto in connection with the accompanying drawing.

In the drawing, Fig. 1 is a diagrammatic view of a mercury boiler embodying my invention; Fig. 2 is an enlarged sectional view along line 2—2 of Fig. 1; and Figs. 3 and 4 are perspective views of a heating element in different stages of manufacture.

The boiler shown in Figs. 1 and 2 comprises a furnace having a wall 10 forming a combustion chamber 11. A drum 12 for containing mercury is supported on the wall 10. The drum has a vapor discharge conduit 13 and is connected to a heating element 14 comprising a plurality of tubes and channel members 15 lining the inner surface of the wall 10 and thereby protecting it against excessive heat in the combustion chamber. Mercury liquid is conducted to the lower ends of the channel members 15 through down-tubes 16 which are disposed at least partly outside the furnace wall 10. The upper ends of the down-tubes are connected to the drum 12 and the lower ends of these tubes are connected to the lower ends of the channel members 15. Each member 15 has a lower portion forming a plurality of channels 17 (Fig. 2). In the present instance I have shown an arrangement in which the lower portion of each channel member 15 forms four cylindrical channels 17. The walls of these channels are integrally united by a heavy foundation member 18 which on its side facing the combustion space is provided with refractory material 19. This material is held on projections 20 integrally formed on the foundation member 18. The upper ends of the channels 17 are connected to the drum 12 by individual tubes 21 (Fig. 1) welded to the walls of said channels. As shown in Fig. 2 the ends of adjacent elements 15 overlap each other, whereby slag is prevented from entering the space defined between the furnace wall 10 and the heating elements 15. No such overlapping arrangement is necessary with respect to the tubular extensions 21 because slag is mainly formed in the lower portion of the combustion space while tubes 21 are provided in an upper portion of the combustion space. The provision of wall screen elements which have lower portions made of solid, massive foundation plates with a plurality of parallel channels formed in each plate permits the provision of mercury wall screen heating elements in the lower portion of mercury boilers of considerable height. With my invention it is no longer necessary to protect the walls in the lower portion of the combustion space by means of wall screen heating elements containing water to be heated and evaporated. An important feature of my invention is the provision of the lower portions of the mercury wall screen heating elements with refractory material 19, as stated above, in order to protect these portions from excessive heat in the combustion space.

In manufacturing a lower portion or channel member 15 of a wall screen heating element, I produce in accordance with my invention a block or foundation member from steel or like material and subject such foundation member to a rolling process. With the rolling process I form on one side of the foundation member a plurality of parallel projections 25, 26 and simultaneously I form on the other side of the foundation member a plurality of other projections, preferably in the form of knobs 20. Adjacent pairs of projections 25 and 26, as indicated in Fig. 3, form rounded recesses 28. The next step in the manufacture of such heating elements is to bend adjacent projections 25 and 26 so that their edges engage each other and their inner surfaces form a cylindrical channel. This step of my invention is indicated in Fig. 4 where walls 29 and 30 have been bent towards each other and form a circular conduit. The outer edges of the walls 29 and 30 form a recess 31. This recess in accordance with the next step of my invention is filled with fused metal, preferably by a welding process, to firmly unite the walls 29 and 30, as indicated at 32. The heavy structure of the lower portion of the wall screen heating elements accomplished with my invention permits heating of the mercury to high temperatures without endangering said lower portions or channel members of the heating elements. The substantially plane walls of said lower portions facilitate the provision of refractory material thereon. This material is securely held in position by the knobs 20 formed on the walls. The attachment of refractory material to said walls may be further facilitated by the provision of ribs. In the present instance I have shown a rib 33 (Fig. 3) intermediate two rows of knobs. This rib 33, together with the knobs as well as the end projections 34 and 35, may be formed in a single rolling process.

With my invention I have accomplished an improved construction and method of making heating elements which meet the requirements of modern, high temperature, high pressure mercury boilers. The elements according to my invention have flat surfaces exposed to the fire, which surfaces absorb the heat uniformly and at the same time form a perfect enclosure of the combustion space in furnaces. The heating elements, especially the lower portions thereof form a plurality of round channels, or, from another viewpoint, a plurality of tubular members for receiving mercury to be heated. Thus the heating elements have all the advantages of round tubes. They require a minimum amount of liquid and can withstand high boiler pressure. Hence, a heating element according to my invention comprises, viewed from another angle, a plurality of round tubes united to form a flat surface.

Having described the method according to my invention, together with the apparatus for carrying out the method, I wish to have it understood that changes may be made in both the apparatus and the method without departing from the spirit of my invention and the scope of the appended claims.

What I claim as new and desire to secure by Letters Patent of the United States, is:

1. The method of manufacturing a heating element having a plurality of substantially parallel channels for containing a fluid to be heated, said method including the steps of subjecting a foundation member to a rolling process to form thereby a plurality of parallel walls on one side of the foundation member, and uniting adjacent walls to form channels.

2. The method of manufacturing a heating element having a plurality of substantially parallel channels for containing a fluid to be heated, said method including the steps of subjecting a foundation member to a rolling process to form thereby a plurality of parallel walls on one side of the foundation member, bending adjacent walls in opposite directions, and uniting the edges of the bent walls by a welding process.

3. The method of manufacturing a heating element having a plurality of substantially parallel channels for containing fluid to be heated, said method including the steps of subjecting a foundation member to a rolling process to form a plurality of parallel walls thereon with adjacent pairs of walls forming rounded recesses, bending the walls of each pair towards each other to form cylindrical channels, and integrally uniting the edges of each pair of walls.

4. The method of manufacturing a heating element having a plurality of substantially parallel channels for containing a fluid to be heated, said method comprising the steps of subjecting a block of steel to a rolling process to form a plurality of parallel walls on one side and projections on the other side thereof, bending adjacent walls towards each other, and uniting the edges of the bent walls by welding.

LEONARD R. BIGGS.